Dec. 8, 1925.

E. KIBELE 1,564,484

PACKING RING FOR PUMP PISTONS

Filed Jan. 17, 1925

EUGENE KIBELE, Inventor

By Jesse R. Stone

Attorney

Patented Dec. 8, 1925.

1,564,484

UNITED STATES PATENT OFFICE.

EUGENE KIBELE, OF SAN ANTONIO, TEXAS.

PACKING RING FOR PUMP PISTONS.

Application filed January 17, 1925. Serial No. 3,104.

*To all whom it may concern:*

Be it known that I, EUGENE KIBELE, a citizen of the United States, residing at 311 Warwick Boulevard, San Antonio, Texas, have invented a certain new and useful Improvement in Packing Rings for Pump Pistons, of which the following is a specification.

My invention relates to pump pistons and more particularly to the packing ring to be employed on double action pumps for forcing liquids through pipes.

It is an object of my invention to provide a packing ring for use on pump pistons, which will act most effectively in forming a tight seal against the walls of the pump cylinder at both ends of the piston. It is also desired to so form the packing ring that it may be made to contact with the cylinder walls with varying degrees of force and with varying extent of wear surface as desired.

Figure 1:
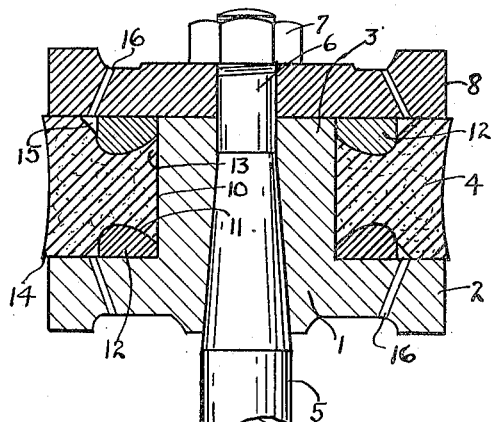
Figure 2:
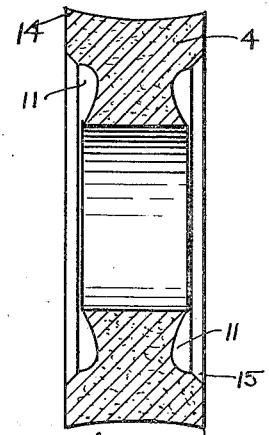

Referring to the drawing herewith, Fig. 1 is a central longitudinal section through a pump piston showing my invention employed thereon. Fig. 2 is a central section through the packing ring alone. Like numerals of reference are used to designate like parts in all the views.

The packing ring constituting my invention is adapted to be mounted upon a piston comprising a piston head 1 having, at its inner end, a radial flange 2. The body is cylindrical at 3 to furnish a seat for the packing ring 4. The flange is the full diameter required to fit the cylinder in which it works.

Said head has a central opening therethrough to receive the piston rod 5, the forward end of which is cylindrical at 6 and said rod is extended and threaded to receive a clamping nut 7.

At the outer end of the piston head is the follower plate 8 of the same external diameter as said flange 2.

Between the follower plate and the flange is the seat 10 for the said packing ring 4 of rubber or some similar flexible composition. Said packing has opposite annular recesses 11 on each side thereof adjacent the seat 10, so formed as to receive the retaining rings 12. Said rings fit the seat 10 and, being widest at their outer sides, they overlie the inner portion 13 of the packing ring and thus serve to retain it firmly on its seat.

The outer periphery of the packing ring is concave between its ends, as shown in the drawings, thus forming lips 14 at each end projecting normally beyond the face of the piston body and follower plate. Adjacent the rings 12, the packing ring is beveled at 15 to provide annular recesses to receive the liquid being pumped. Said liquid finds entrance thereto by way of ducts 16 extending through the flange 2 and follower plate 8, as shown in Fig. 1.

In assembling the piston the inner ring 12 is placed in position. The packing ring 4 is then placed on its seat, the outer ring 12 and follower plate are then assembled and the clamping nut 7 screwed up tightly. The packing ring 4 is normally of greatest external diameter at each end, as described, but this shape can be changed somewhat to make it more nearly cylindrical by tightening the plate 8 by means of the nut. The relative lengths of the head 3 and the ring 4 may be formed so as to allow the rings 12 to be so firmly clamped against the inner side of the ring 4 as to draw it inwardly at each end to some extent, thus varying the extent of the lips 14 and causing the central portion to be forced outwardly more strongly.

In operation the fluid being pumped will enter the ducts 16 on the advancing end and thus exert a pressure outwardly on the advancing end of the packing ring. The lip 14 at that end will be compressed by the cylinder wall, but will project sufficiently to make a close fit with the cylinder wall at all times, but this fit will be made more firm through the assistance of the pressure of the liquid being pumped. On the receding end of the piston, the suction there exerted will act through the ducts 16 at that end to draw the lip 14 inwardly sufficiently to prevent wear at the receding side. When the suction is released upon the return stroke, the lip at that end will spring outwardly and the action due to the fluid pressure will be reversed in an obvious manner.

By constructing the piston ring with the longitudinally curved periphery, as described, I am enabled to get an effective and firm seal with the wall of the cylinder; and this seal is maintained even after material wear has taken place. This is due to the force of the liquid being pumped. For the beveled recess 15 not only allows the ring to be forced inwardly by the pressure of the cylinder walls, but also allows the liquid pressure to be exerted most effectively.

Having thus described my invention, what I claim as new and desire to protect by Letters Patent is:

1. In a pump piston, a piston body having a central annular recess forming a seat, a packing ring of compressible material therein, and means to prevent radial movement of said ring in its seat, said ring being concaved longitudinally on its outer periphery to form outwardly extending lips at each end thereof.

2. In a pump piston, a piston body having a central annular seat, a packing ring of compressible material in said seat said ring having end recesses therein, and rings of rigid material fitting in said end recesses to retain and reinforce said packing ring, said packing ring having outwardly curved lips at each end for the purpose described.

3. In a pump piston, a piston head having a radial flange at one end, a follower plate at the other end, means to clamp said follower plate against said head, a packing ring of compressible material between said flange and follower plate, and rings of rigid material at each end of said packing ring adapted to be clamped against said packing ring; the outer periphery of said packing ring having radially extending lips at each end.

4. In a pump piston, a piston head having a central annular recess, a compressible packing ring in said recess, and means to clamp said ring therein, said packing having beveled grooves at each end and outwardly curved lips on its periphery, there being fluid passage in said piston head leading to said grooves.

5. In a pump piston, a piston head, an annular seat centrally thereof, and a compressible packing ring therein, having its periphery concaved longitudinally to form outwardly curved ends to bear against and be compressed by the cylinder walls, and means whereby fluid pressure may be exerted on said packing ring at the advancing end thereof.

6. A packing ring for pump pistons, said ring being of compressible material and having annular recesses at each end to receive retaining rings and outwardly curved lips in the manner described.

In testimony whereof I hereunto affix my signature this 13th day of January, A. D. 1925.

EUGENE KIBELE.